United States Patent [19]

McWilliams

[11] 3,779,404
[45] Dec. 18, 1973

[54] APPARATUS FOR LOADING MAIL BAGS INTO A HIGHWAY VEHICLE

[76] Inventor: Joseph E. McWilliams, 1345 Canterbury Ln., Glenview, Ill. 60025

[22] Filed: July 27, 1972

[21] Appl. No.: 275,790

[52] U.S. Cl..................... 214/41, 198/90, 198/122, 198/128, 214/6 G
[51] Int. Cl............................................. B65g 67/08
[58] Field of Search ............... 214/41, 6 G; 198/99, 198/90, 122, 128

[56] References Cited
UNITED STATES PATENTS
2,660,432  11/1953  Wilske........................... 214/6 G X
3,651,963  3/1972  McWilliams..................... 214/41 X

Primary Examiner—Robert G. Sheridan
Attorney—Robert C. Brown, Jr. et al.

[57] ABSTRACT

The invention relates to loading of mail bags from a loading dock into an end loading highway vehicle to fully and completely load the vehicle, in which a wheeled frame is provided with an upright support on which is mounted a forward conveyor section for swinging movement about a horizontal axis adjacent its rearward end for elevational distribution of the mail bags, and that carries a high speed bag propelling belt conveyor. Associated with the wheeled frame is a second conveyor section having its forward end approximating the elevation of the rearward end of the first conveyor section, and having its rearward end at an elevation for convenient manual loading of mail bags thereon. The second conveyor section includes a belt conveyor operating at a lower speed for conveying mail bags received thereon to the high speed propelling conveyor. Both conveyor sections have dimensions transversely thereof that substantially span the transverse dimension of the vehicle loading area, and several ways are disclosed for supplying mail bags from the loading dock to the belt of the second conveyor section, either in single bag form or in multiple bag form.

11 Claims, 12 Drawing Figures

APPARATUS FOR LOADING MAIL BAGS INTO A HIGHWAY VEHICLE

This invention relates to apparatus for loading mail bags into highway vehicles of the end loading type, and more particularly, to arrangements for mechanically conveying mail bags from a loading dock into a highway vehicle and compactly loading them in the vehicle throughout its full length.

The Applicant has devised a number of ways to facilitate the loading of bagged mail into end loading highway vehicles, some of which are illustrated by his U.S. Pat. Nos. 3,266,465, 3,458,064, 3,507,411, and 3,651,983. The methods and apparatus involved in these patents were devised to replace the essentially manual loading procedures that in the past have unduly tied up valuable equipment and required strenous efforts by the workers involved.

In accordance with the inventions disclosed in the patents referred to above, mail bags are oriented on the loading dock in the positions they are to have in the vehicle, and then are mechanically moved into the vehicle and are stacked while maintaining such orientation, with the operator not having to enter the vehicle loading area, or the bags not having to be palleted in groups to reduce individual bag handling.

A principal object of this invention is to provide a bag propelling vehicle loader that is of substantially full vehicle width in proportions and permits vertical adjustment of the bag trajectory while providing a vertically adjustable damming arrangement for restraining bag roll back.

Another principal object of the invention is to provide a roll up type baffle arrangement for bag propelling type vehicle loaders that automatically adjusts in effective height as the bag trajectory elevation is varied.

Still other objects of the invention are to provide apparatus for loading bagged mail in transport vehicles that mechanizes the placing of the bags in the vehicle, that provides compact loading for substantially the full height of the vehicle, and that is economical of manufacture, convenient to operate, and long lived in use.

In accordance with this invention, the impelling conveyor is of the substantially full vehicle width type, and is mounted at its rearward end on a wheeled frame for swinging movement about a horizontal axis disposed adjacent the mid height level of the vehicle. The forward or discharge end of the impelling vehicle is supported by power operated extensible and contractable devices for vertically swinging the discharge end of the propelling conveyor to vary the trajectory of the bags as is necessary to achieve full height loading in the vehicle. Operating between the discharge end of the propelling conveyor and the forward end of the wheeled frame is a roll up type baffle member which dams the propelled bags against significant rebound rearwardly of the propelling conveyor. Associated with the propelling conveyor is a bag receiving conveyor of comparable width to which bags may be applied in full width loads or in single bag form. In several forms of the invention, the bag receiving conveyor has its rearward end elevationally positioned for convenient hand loading of bags onto same, whereby manual loading of the bags on the bag receiving conveyor, from a standard hand truck, may be effected, or a special tilting unloading hand truck may be employed to dump an entire hand truck load of bags on the bag receiving conveyor.

In alternate arrangements, the bag receiving conveyor extends onto the loading dock for loading from a bag discharge chute, or the bag receiving conveyor is supplied bags by a bag feeding conveyor of the single file conveying type that has its forward end connected thereto for shifting movement laterally thereof for spotting the bags laterally of the bag receiving conveyor.

Other objects, uses and advantages will be obvious or become apparent from a consideration of the following detailed description and the application drawings.

However, it is to be understood that the specific drawing illustrations provided are supplied primarily to comply with the requirements of the Patent Laws, and that the invention is susceptible of other embodiments which are intended to be covered by the appended claims.

GENERAL DESCRIPTION

Figures 1, 1A, 1B, 2:
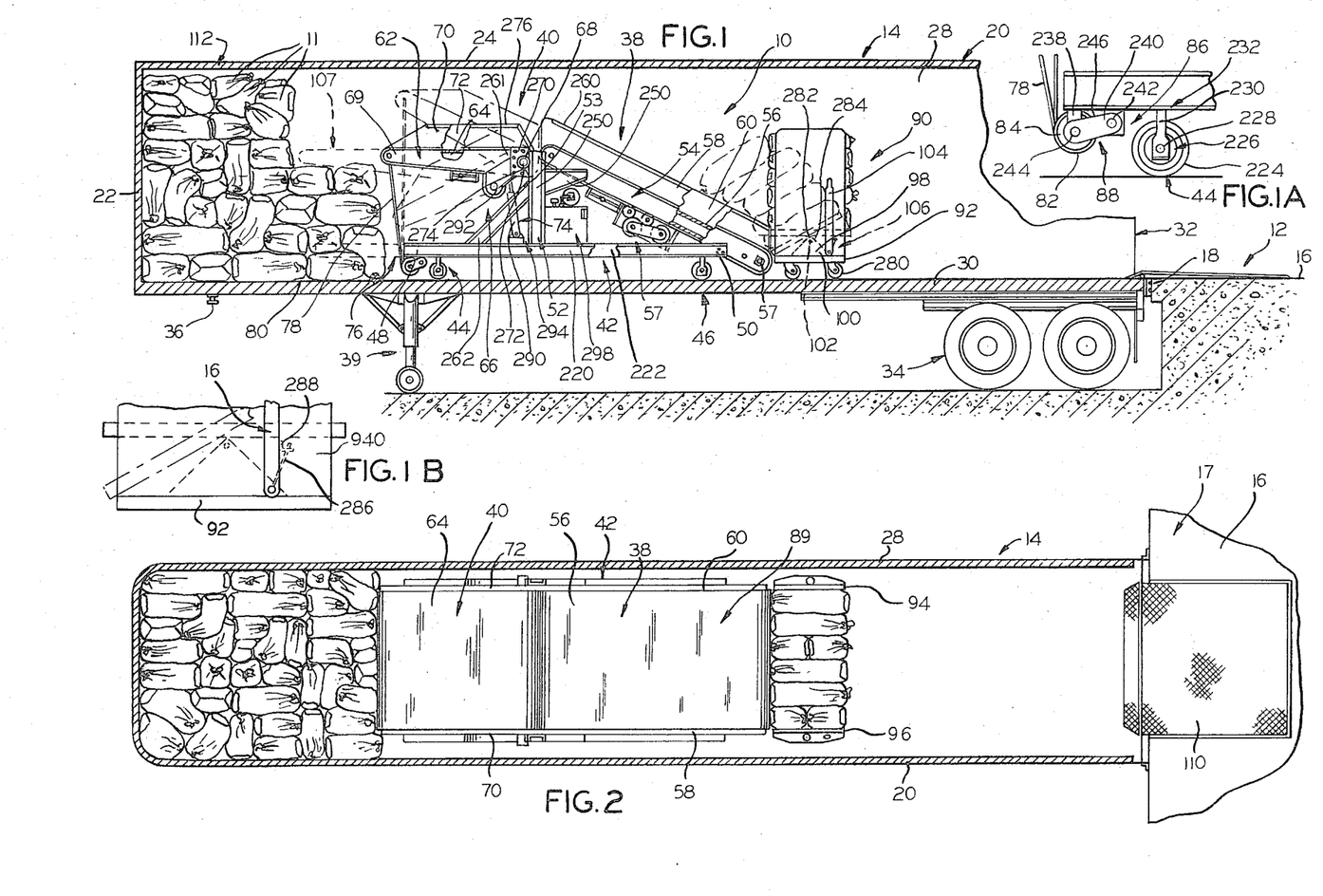
FIG. 1 is a diagrammatic side elevational view of a semi-trailer in the process of being loaded in accordance with the present invention, with the semi-trailer and adjacent loading dock facilities being shown in section.
FIG. 1A is a fragmental elevational view, on an enlarged scale, of the roll up type bag restraining dam device of this invention.
FIG. 1B is a fragmental elevational view illustrating the general nature of the hand truck tilting body latch device that is shown in FIG. 1.
FIG. 2 is a plan view of the apparatus shown in FIG. 1, with the highway vehicle being shown in horizontal section.

Reference numeral 10 of FIGS. 1 and 2 generally indicates one embodiment of the present invention for loading mail bags from a loading dock 12 into an end loading highway vehicle 14, which vehicle has been illustrated as being in the form of the familiar semi-trailer, although the invention is readily applicable to any end loading vehicle proportioned to receive the apparatus 10.

It is assumed that the mail bag handling installations involved include the loading dock 12 (of a post office or the like), that is conveniently provided with a level load support surface 16, and the usual shoulder or end 18 adjacent to which the vehicle is backed up at a bay 17 for purposes of being loaded.

It is also assumed that the vehicle 14 is in the form of the usual body 20 defined by forward end wall 22, top wall 24, side walls 26 and 28, floor 30 and end opening 32 that is customarily closed by suitable doors or the like (not shown). The body 20, being of the semi-trailer type, rides on the usual rear wheels 34 and is provided with the usual king pin 36 for connection to the fifth wheel of a conventional tractor truck (not shown). When disconnected from the tractor truck, the vehicle 14 rests on suitable retractable props 39 adjacent its forward end.

In accordance with this invention there is associated therewith the loading dock 12 at the bay 17 the apparatus 10, which comprises a mail bag receiving conveyor 38 and a mail bag propelling or positioning conveyor 40, the conveyors 38 and 40 being mounted on wheeled frame 42 riding on suitably hydraulically driven wheels 44 and 46 at the respective ends 48 and 50 of the wheeled frame 42.

The wheeled frame 42 in the form of FIGS. 1 and 2 is provided with an upright support structure 52 adjacent the mid portion of the frame 42, with the conveyor 38 being mounted between the end 50 of the frame 42 and the upper portion 53 of support structure 52 in the inclined relation that is indicated in FIG. 1. Conveyor 38 generally comprises a frame 54 on which suitable conveyor belt 56 is trained and driven by suitable power drive 57, and guide walls 58 and 60 are suitably affixed to the frame 54 and extend along either side of the conveyor 56 to keep the mail bags 11 that are to be conveyed by the conveyor 38 from spilling or dropping over either side of the conveyor 38.

The conveyor 40 comprises a suitable frame 62 over which high speed propelling belt 64 is trained, which is driven by suitable power drive 66. Frame 62 is mounted at its rear end 67 on the support structure 52 for swinging movement about horizontal axis 68, and has secured to either side of same guide plates 70 and 72 for guiding mail bags being conveyed by belt 64. Frame 62 is supported by one or more power operated extensible and contractable prop devices 74 which operate to shift the forward end 69 of the frame vertically to move the frame between the upwardly and downwardly inclined operating positions indicated by the broken line showing of FIG. 1.

Operably interconnected between the forward end 69 of frame 62 and the forward end 48 of wheeled frame 42 is the roll up type bag damming or restraining baffle device 76, which comprises a flexible sheet 78 that may be in the form of belting or the like, having its end 80 suitably secured to the frame end 69, and its other end 82 suitably anchored to roller 84 (see FIG. 1A) that is suitably journaled on frame 42 and driven by suitable hydraulic motor 86 through chain type drive 88.

The drive arrangement for roller 84 is such that a constant torque of a low value is applied to the roller 84 in the direction that would wind up sheet 78 is no restraint to wind up is placed on the sheet 78, but which will permit unwinding the sheet 78 if the roller 84 as frame 62 moves from the lower broken line position to the upper broken line position of FIG. 1. Thus, as the frame 62 moves from the upper broken line position to the lower broken line position of FIG. 1, sheet 78 is automatically wound up on roller 84. Drive 86 also maintains sufficient tension on the sheet 78 to accomplish the objectives of the invention of serving as a dam or restraining means to prevent rebound of mail bags rearwardly of the forward end 48 of the frame 42 as the bags 11 are being loaded into the vehicle 14.

Conveyors 38 and 40 together provide an upwardly facing substantially continuous load transporting surface 89 that substantially spans the transverse dimension of the load receiving area of vehicle 14.

In the showing of FIGS. 1 and 2, a tilting body type hand truck 90 is illustrated for use in supplying mail bags 11 to the apparatus 10. Hand truck 90 comprises a suitable wheeled base 92 having upright guide sheets or plates 94 and 96 suitably affixed to the base 92, between which is mounted tilting platform 98 that extends substantially between the sheets 94 and 96 and is mounted on a pair of spaced apart support brackets 100 (although only one is illustrated) for pivotal movement about horizontal axis 102 that extends longitudinally of the hand truck 90. Operating handle 104 operates suitable catch device 106 to release the platform 98, when the hand truck 90 is moved to the position of FIGS. 1 and 2, for dumping of a load of mail bags 11 onto the receiving conveyor 38 in a manner suggested by FIG. 1.

When the vehicle 14 is positioned at bay 17 in the manner indicated in FIGS. 1 and 2 for being loaded with mail bags 11, the apparatus 10 is moved from the loading dock into the highway vehicle, by operating the power wheels 44 and 46, suitable bridge plate 110 being employed to facilitate transfer of the apparatus 10 between the loading dock and the vehicle.

Conveyors 38 and 40 are put into operation, belt 56 being driven at a speed of about 200 feet per minute while belt 64 being driven at a speed at about 550 feet per minute.

Assuming that the vehicle 14 is empty, the operator moves the apparatus 10 to the forward broken line position indicated at 107 in FIG. 1 for piling the bags 11 in the stack 112.

Figure 7:
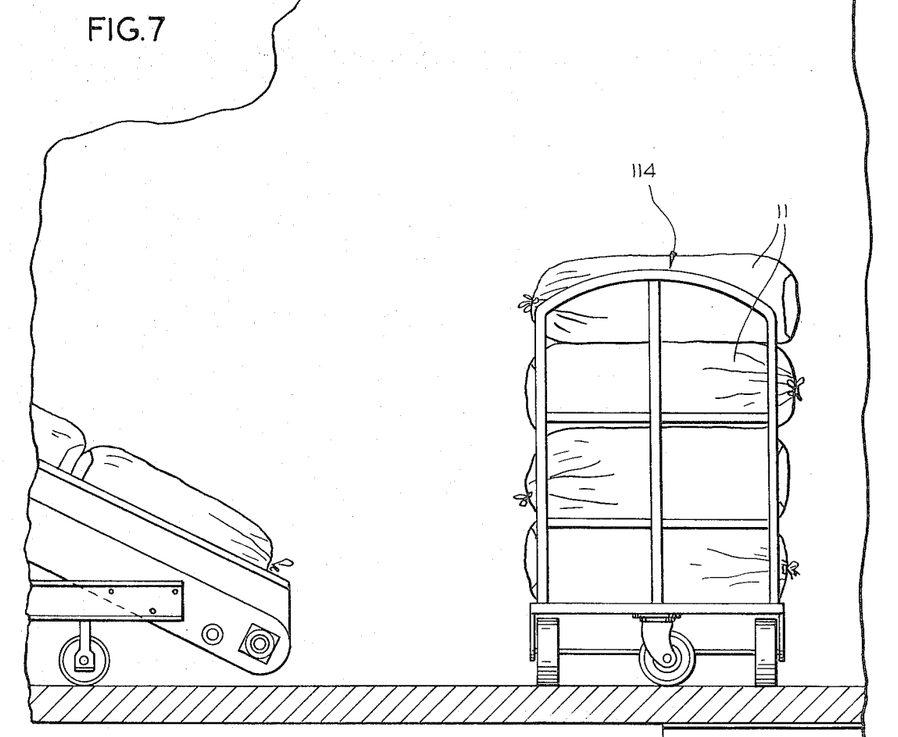
FIG. 7 is a view similar to that of FIG. 3, but illustrating a simplified form of the invention.

The mail bags are then supplied to the receiving conveyor 38 in one of the manners indicated in the drawings. For instance, in the showing of FIG. 7, a conventional hand truck 114 is illustrated loaded with mail bags 11 in the conventional manner which is wheeled into the vehicle 14 and turned crosswise thereof substantially as shown in FIG. 7, for manual unloading of the bags 11 onto the conveyor 38.

The conveyor 40 is initially positioned substantially in a downwardly inclined position for directing the first mail bags toward the forward end of the vehicle 14 and the base of forward wall 22. The bags 11 as they are unloaded from hand truck 114 are moved upwardly of the conveyor 38 by its conveyor belt 56 and transferred to the high speed belt 64 which propels or flings them forwardly into loaded position on the floor of the car adjacent the juncture of the floor 30 and forward wall 22. The operator by appropriately spotting the mail bags on the belt 56 can appropriately position them laterally of the loading area of the vehicle.

Loading of the mail bags onto the conveyor belt 56 continues with the elevation of the forward end 69 of conveyor frame 62 being raised as required to build up the stack 112 vertically, with the conveyor 40 being positioned at its upwardly inclined angulation for slinging bags between the upper end of the stack 112 and the top wall or ceiling of the vehicle 14.

Since the bags 11 are propelled with considerable impetus from the conveyor 40, they will tend to bounce back or rebound and it is the function of the roll up dam device 76 to preclude bag rebound rearwardly of the forward end 48 of the frame 42. As the conveyor 40 swings vertically upwardly about axis 68, device 76 automatically extends to increase the height of the dam or retaining wall type configuration presented by sheet 78.

When the build up of stack 112 has been completed up to as high as bags can be sufficiently flung between the available space between the top of the stack and the vehicle top wall 24, the apparatus 10 is moved rearwardly to approximately the full line position of FIG. 1, and further piling of hand bags is continued, with the bags being supplied to the receiving conveyor 38 from loaded hand trucks 114 that are brought from a loading dock and positioned as indicated in FIG. 7 for unloading, and after they are unloaded, are returned to the loading dock for reloading and are replaced by loaded hand trucks 114.

This procedure continues until the vehicle 14 is fully loaded, after which opening 32 is closed in any suitable manner and the vehicle 14 driven away to be replaced by another vehicle that is loaded in a similar manner.

Instead of using a conventional hand truck 114, the tilting load platform truck 90 may be employed, with the hand truck being loaded to capacity, and with control handle 104 set to maintain platform 98 in its horizontal position, and then the hand truck 90 wheeled to the position shown in FIGS. 1 and 2, after which the handle 104 is operated to unlatch the tilting platform 98, after which the mail bag load is pushed in the direction of conveyor 38 for en masse discharge of the mail bag load onto the belt 56. The pivot axis 102 of the hand truck 90 is preferably positioned somewhat to the right of the longitudinal center of hand truck 90 so that when control handle 104 is operated to release the platform 98 for tilting purposes, platform 98 will tend to tilt in the direction of conveyor 38 (assuming that the hand truck 90 is positioned in the manner indicated in FIGS. 1 and 2 of the drawings).

Figures 3, 3A:
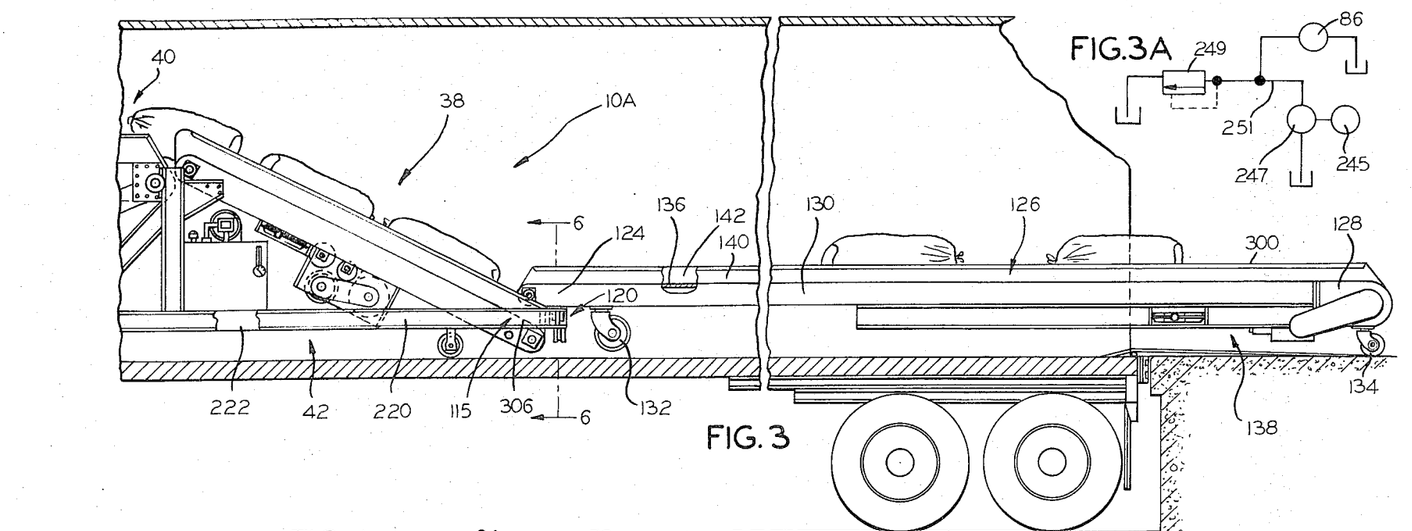
FIG. 3 is similar to that of FIG. 1, but illustrates a modified form of the invention in which a single file bag conveying feeding conveyor is employed to supply the bags to the bag loading apparatus from the loading dock, with parts being broken away to facilitate illustration.
FIG. 3A is a diagrammatic view of a hydraulic circuit employed in connection with this invention.
Figure 4:
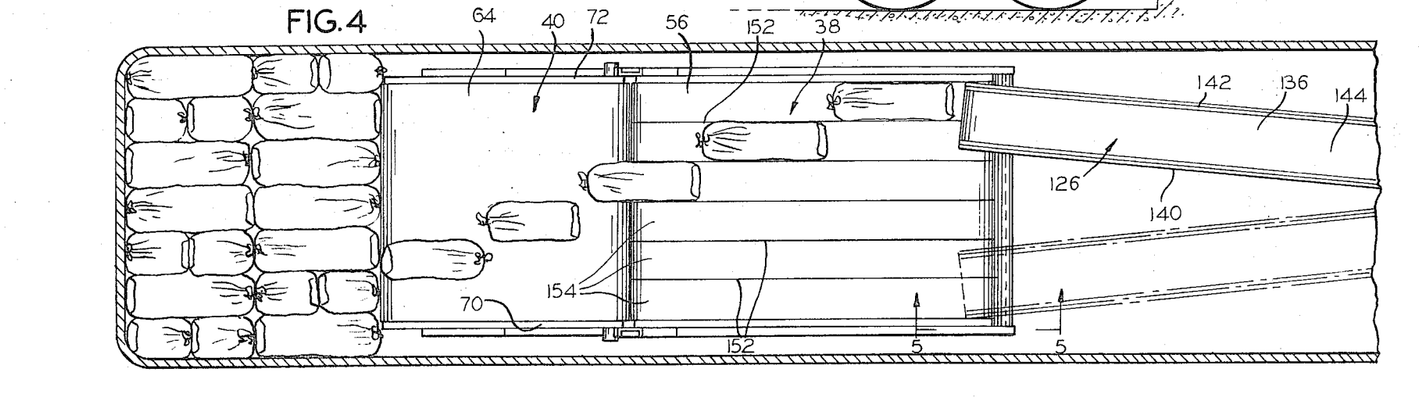
FIG. 4 is a plan view of the apparatus shown in FIG. 3, with parts broken away to facilitate illustration.
Figures 5, 6:
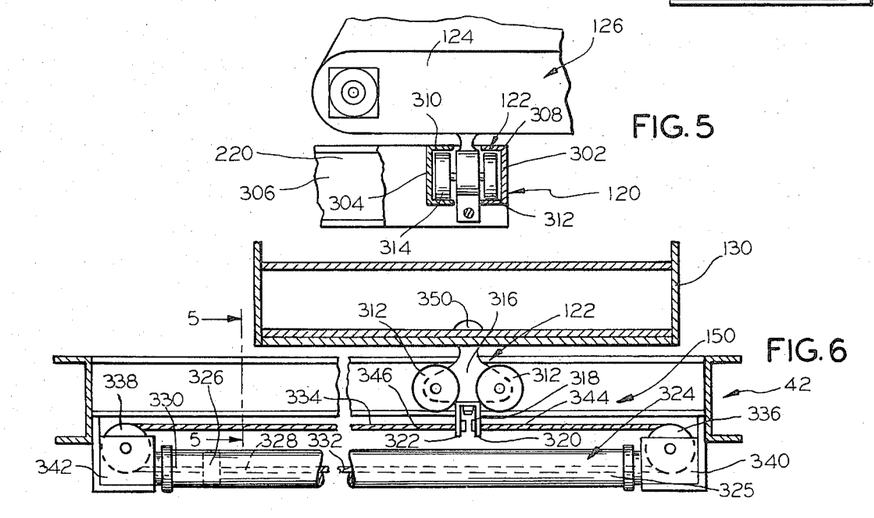
FIG. 5 is a fragmental elevational view taken substantially along line 5—5 of FIG. 4, with parts being shown in section.
FIG. 6 is a sectional view taken substantially along line 6—6 of FIG. 3.

In the embodiment 10A of FIGS. 3 and 4, conveyors 38 and 40 and wheeled frame 42 are substantially the same as shown in FIGS. 1 and 2 except that the wheeled frame 42 is extended rearwardly somewhat as at 115 and mounts a guideway 120 (see FIGS. 5 and 6) that extends transversely thereof to receive a trolley 122 to which is secured the forward end 124 of feeding conveyor 126 that is proportioned to have its rearward end 128 extend back to the loading dock when the apparatus 10A is positioned to start loading mail bags at the forward end of the vehicle 14. Conveyor 126 generally comprises frame 130 mounted on front casters 132 and rear casters 134 and having conveyor belt 136 trained thereover which is driven by suitable power drive 138 to operate at a speed of about 200 feet per minute. Frame 130 is suitably connected to trolley 122 and is provided with upstanding guide walls 140 and 142 on either side thereof that are suitably connected to frame 130 and serve to guide the forward movement of the mail bags 11.

As indicated in FIG. 4, conveyor 126 defines an upwardly facing conveyor surface 144 that has a width transversely thereof that approximates the width of the mail bags and is at a level above the loading dock in vehicle floor for convenient manual loading of the bags 11 on the conveyor 136.

Trolley 122 is moved longitudinally of guideway 120 by power drive apparatus 150 (see FIG. 6) to spot individual bags laterally of the conveyor 38 for facilitating their placement within the vehicle.

In the specific embodiment illustrated in FIGS. 3 and 4, the conveyor belt 56 has formed thereon a plurality of indicating lines 152 for indicating to the operator appropriate paths of movement 154 for the bags in terms of proper application of same to the conveyor 56.

Apparatus 10A is used the same way as apparatus 10, except that the mail bags are loaded onto the feeding conveyor 126 at the rearward end of same and the operator, by positioning the discharge end of the conveyor 126 as may seem appropriate during the loading operation, with respect to the path of movement 154, effects a more or less balanced loading of the vehicle transversely thereof.

Figure 8:
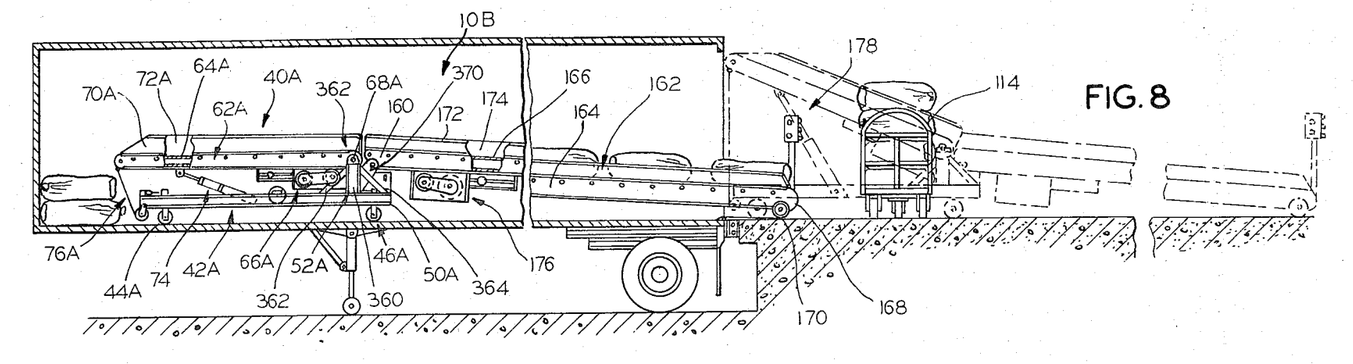
FIGS. 8 and 9 are views similar to that of FIG. 1, but illustrating modified forms of the invention.

In the apparatus 10B of FIG. 8, the propelling conveyor 40A is similar to conveyor 40 and is mounted on wheeled frame 42A that is similar to wheeled frame 42. Conveyor 38 is omitted and conveyor 40A extends substantially the length of wheeled frame 42A, it being mounted on support structure 52A for swinging movement about horizontal axis 68A. Extensible and retractable prop devices 74 are employed to vary the angulation of conveyor 40A with respect to the horizontal. As indicated in FIG. 8, conveyor 40A and wheeled frame 42A are equipped with a roll up type dam device 76A that is the same as device 76.

Frame 42A and its rear end 50A supports the forward end 160 of feeding conveyor 162 that is of the full vehicle width type, in that it substantially spans the transverse dimension of the loading area of the vehicle. Conveyor 162 comprises frame 164 over which conveyor belt 166 is trained, and which at its rearward end 168 rides on suitable rear wheels 170. Conveyor 162 is equipped with spaced side guide members 172 and 174 to insure that the bags remain on conveyor 166 as they are transported thereby. Conveyor belt 166 is driven by suitable power drive apparatus 176.

Conveyor 162 is proportioned so that when the apparatus is positioned in the full line position of FIG. 8, the rear end of the conveyor 162 will project outwardly of the vehicle onto the loading dock for easy application thereto of mail bags from a suitable hand truck 114, or alternately, the special hand truck 90. Conveyor 162 is provided with a suitable control panel 178 for controlling the operation of the apparatus 10 leading from the loading dock.

Apparatus 10B may be operated in a manner similar to the previously referred to embodiments of the invention, except that the conveyor 162 is loaded directly from the loading dock. After loading is completed, the apparatus 10B will be drawn to the right of FIG. 8 to substantially the position indicated by the broken line showing of that figure.

Figure 9:
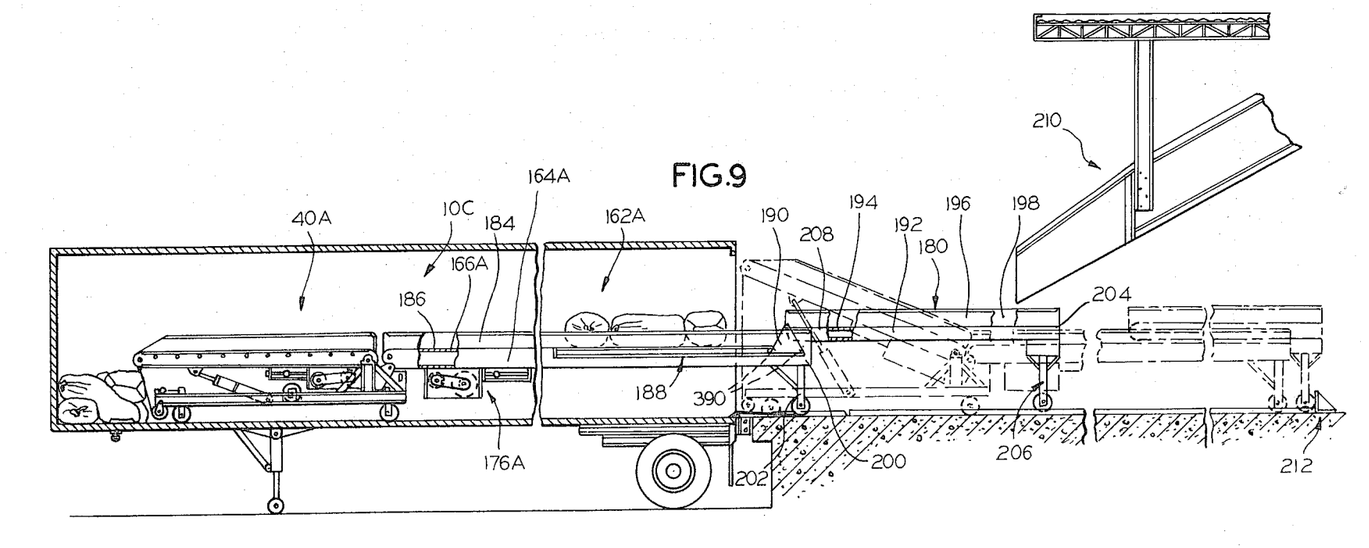

In the embodiment 10C of FIG. 9, propelling conveyor 40A is the same as shown in FIG. 8, and the feeding conveyor 162A takes the form of frame 164A that is telescopingly related with supplemental conveyor section 180. Conveyor 162A in addition to the frame 164 comprises full width conveyor belt 166A driven by suitable power drive apparatus 176A, and includes spaced side guide panel members 184 and 186 that insure maintenance of the bags on the conveyor 166A. Frame 164 includes trackway structure 188 on either side of same in which ride trolleys 190 that are suitably secured to either side of the frame 192 of supplemental conveyor 180 section. Conveyor section 180 includes conveyor belt 194 that is suitably driven and spaced side guide panels or members 196 and 198 that serve to keep the bags on the conveyor section 180.

The rear end 200 of the conveyor frame 164A is suitably supported on wheeled legs, while the rear end 204 of the supplemental conveyor 180 is suitably supported on wheeled legs 206. The forward end 208 of the supplemental conveyor 180 is suitably connected to the respective trolleys 190, which are disposed on either side of, and outwardly of, the guide panels 184 and 186 of conveyor 162.

The apparatus 10C is operated in a manner similar to that of FIG. 8, except that conveyors 162A and 180 are arranged to be loaded by bags being sent down discharge chute structure 210, with the parts being arranged so that when the conveyor 180 is in its extended relation with respect to the conveyor 162A, the bags will discharge from chute 210 adjacent the rear end 204 of the supplemental conveyor 180 and be conveyed onto the conveyor 162A for conveyance to impeller conveyor 40A. As the vehicle 14 is loaded, the apparatus 10C is moved rearwardly or outwardly of the vehicle, with supplemental conveyor 180 telescoping over conveyor 162A to shorten the overall operating length of the conveyors 162A and 180. The apparatus 10C may be contracted to its broken line position of FIG. 9 in completing loading of the vehicle, with a suitable stop 212 being provided on the loading dock 12 to limit movement of the conveyor 180 to the right of FIG. 9. Conveyor belt 194 has a width comparable to that of the full width belt 166A, and chute 210 has a width approximating the width of belt 194.

SPECIFIC DESCRIPTION

The loading dock 12 that is illustrated is intended to be representative of conventional loading docks now commonly associated with post office installations or the like.

The vehicle 14 may be of any suitable standard type, that illustrated being intended to represent a typical vehicle now in use in connection with the transportation of bagged mail, though it is to be understood that the invention is equally applicable to other vehicles that are not of the semi-trailer type.

Wheeled frame 42 in the form shown comprises a pair of longitudinally extending channel members 220 and 222 suitably fixed together in spaced apart relation by transverse members that are not shown, and suitably mounting power wheels 44 and 46.

Power wheels 44 are two in number at the front end 48 of the frame 42 (although only one is illustrated), and in the form shown each comprises a rim 224 (see FIG. 1A) suitably driven by a hydraulic power device 226 mounted within the rim 224 in a manner comparable or equivalent to conventional hydraulically driven conveyor rollers. The hydraulic drive mechanism 226 is journaled as at 228 within the arms 230 of a clevis structure 232 that is suitably journaled in frame 42 for movement about a vertical axis under a suitable hydraulically actuated power mechanism (not shown). The other wheel 44 is similar, as are both power wheels 44, it being contemplated that the power wheels 44 and 46 be adjustable about the vertical axis of the respective clevises 232 so that the wheels can be positioned at 90° with respect to their positions of FIG. 1 so that the apparatus 10 can be moved sidewise of the apparatus 10 to an adjacent loading bay, when the apparatus 10 is fully supported on the loading dock 12.

The sheet 78 of the roll up dam device 76 may take the form of conventional conveyor belting, and roller 84 is journaled between spaced bracket plates 238 (see FIG. 238) suitably affixed to the respective frame members 220 and 222 of the wheeled frame 42. Hydraulic motor 86 may be of any suitable type and powers drive chain 240 that is trained over the respective sprockets 242 and 244 that are respectively keyed to the motor 86 and roller 84 for drive transmitting purposes. Drive chain 240 is covered by protecting shield 246.

Hydraulic motor 86, which may be of the vane type, is driven by a suitable electric motor 245 (see FIG. 3A) driving a hydraulic pump 247, both of which are suitably mounted on frame 42, with the motor 48 being driven under constant or uniform hydraulic pressure drive conditions to provide a uniform torque on roller 84. As indicated, the torque selected should be sufficient to properly tension sheeting 78 to resist bounce back of mail bags being piled by conveyor 40 and yet permit the free elevation of the forward end of conveyor 40 for proper bag trajectory providing conditions. This may be done in any suitable manner, as by providing relief valve 249 of an adjustable type that connects between hydraulic liquid supply line 251 extending between pump 247 and motor 86 and tank, which valve 245 returns to tank excess hydraulic liquid, due both to the uniform pressure providing function of valve 245 and reverse operation. Valve 249 is set to maintain a uniform pressure on the order of 1500 psig in line 251.

The belt 56 of conveyor 38 may be trained in any appropriate manner on frame 54 and drive 58 may be of any suitable type for driving a belt conveyor at the speed indicated.

The frame structure 52 comprises a pair of spaced apart vertical or upright channel members 250 on either side of the frame 42, each provided with a rearwardly extending brace arm 252, the frame 54 being suitably affixed between the respective members 250 and their brace arms 252 on either side of the frame 42. The frame 54 and its rearward end 57 is suitably affixed between the rearward ends of the wheeled frame members 220 and 222, with the lower end of the frame 254 being positioned so that the belt 56 at its lower end is disposed at an elevation for convenient manual loading of the mail bags on the conveyor 56.

The guide panels or members 58 and 60 may be suitable metal plates reinforced at their upper ends by the curved edge portions 260. The guide panels of the other conveyors illustrated are similarly arranged.

Support structure 52 is braced forwardly of same by a pair of spaced apart diagonal frame members 262 extending between the respective channel members 250 and the wheeled frame 42 and fixed therebetween in any suitable manner.

Conveyor 40 has its rear end 67 mounted on support structure 52 by employing a suitable bracket structure 270 on either side of same each provided with a stub shaft 272, with respective stub shafts 272 being journaled in suitable pillow block type bearings 274 that are suitably mounted on the upper ends of the channel members 250. The drive 66 for the conveyor 40 may be of any type suitable for driving the belt 64 at a speed on the order of that indicated, and guide panels or members 70 and 72 may be metal plates reinforced at their upper edges by curled edging 276.

With regard to the special hand truck 90, the wheeled base 92 may be of any suitable construction, it including the usual casters 280 to facilitate maneuverability. Brackets 100 are suitably affixed to the base 92 and may comprise angled plates having the triangular configuration illustrated, with suitable pins 282 extending between the respective plates 100 and corresponding brackets 284 affixed to the underside of tilting platform 98 providing the pivot mounting that is desired.

Control handle 104 is keyed to a latch arm 286 that is received over a hook arm 288 affixed to underside of platform 98. Any other suitable latching device may be employed.

The power operated extensible and contractable devices 74 are two in number in the illustrated embodiment, although they may be of any convenient number depending on the loads to be carried by the conveyor 40.

Devices 74 each comprise the usual hydraulic cylinder 290 operably receiving piston rod 292, with the cylinder 290 being suitably pivotally connected as at 294 to the frame 42, and the piston rod 292 being suitably pivotally connected to the frame 62 as at 296. Devices 74 are suitably spaced apart transversely of frame 42 and are hydraulically operated by a suitable source of hydraulic liquid supplied and returned to hydraulic control apparatus 298 that may be of any suitable character, and which also is equipped to operate the drive wheels 44 and 50, both for driving and directional control purposes.

In the apparatus 10A, the power drive 138 for conveyor belt 136 may be of any type suitable for this application, and casters 132 and 134 may be of any suitable type and suitably secured to the frame 126. Guide panels or plates 140 and 142 may comprise suitable metallic plates having their upper edges curled over for reinforcing purposes, as at 300.

Guideway 120 (see FIGS. 5 and 6) comprises a pair of channel members 302 and 304 suitably fixed between the extensions 306 of the frame members 222 and 220 of frame 42. Channel members 302 and 304 respectively define trackways 308 and 310 in which ride the respective pairs of rollers 312 and 314 that are suitably journaled on trolley 122 on either side of same. Trolley 122 comprises a suitable body 316 appropriately affixed to frame 130 and on its underside carrying a U bracket 318 having its respective arms 320 and 322 connected to power operated device 150. Device 150 is commercially available and generally comprises a hydraulic cylinder device 324 comprising a hydraulic cylinder 325 having reciprocably mounted therein a suitable piston 326 which has anchored to either side thereof the ends 328 and 330 of the respective cable lengths 332 and 334 which are respectively trained over the respective pulleys 336 and 338 that are respectively journaled in suitable mounting structures 340 and 342 suitably affixed to frame 42.

The other ends 344 and 346 are anchored to the respective arms 320 and 322 of U bracket 318. By actuating the piston 326 to move longitudinally of the hydraulic cylinder 325, the conveyor 126 is actuated to move laterally of the wheeled frame 42. In so doing, frame 130 pivots about the longitudinal axis of king pin 350 that connects the trolley structure 316 to conveyor frame 130, the casters 132 and 134 readily accommodating this movement.

Power drive 138 for belt 136 may be of any type suitable for the purpose.

In the apparatus 10B of FIG. 8, the power drive 176 of conveyor 162 may be of any suitable type appropriate for driving belt 166 under the conditions indicated, and guide panels 172 and 174 may be similar to the corresponding guide panels of the embodiments of FIGS. 1 – 7.

The wheeled frame 42A is generally similar to frame 42, support structure 52 comprising a pair of spaced upright channel members 360 between which conveyor 40A is journaled as at 362, in a manner comparable to conveyor 40, with the members 360 being suitably braced by diagonal members 362 and 364.

Conveyor 40A comprises frame 62A over which full width conveyor belt 64A is suitably trained, which frame is provided with guide panels 70A and 72A that are comparable to the corresponding guide panels of the conveyor 40.

Roll up type dam device 76A may be the same as device 76, and extensible and contractable prop devices 74 may be similar to those on the apparatus 10. Frame 42A also includes the power operated wheels 44A and 46A, which may be arranged for driving frame 42A longitudinally thereof only in view of the nature of feeding conveyor 162. Conveyor belt 64A is driven by power drive 66A that may be suitable for driving the conveyor belt 64A under the circumstances indicated.

Frame 164 of conveyor 162 is mounted at the forward end thereof on and between spaced support arms 370 that are suitably affixed to wheeled frame 42A. Belt 166 has a width comparable to that of belt 64A. Control panel 178 carried by frame 164 permits finger tip control of apparatus 10B from the loading dock.

In the embodiment of FIG. 9, the conveyor 40A may be the same as shown in FIG. 8, and the conveyor 162A similar to the conveyor 162, except for the differences already noted. The drive for the conveyor belt 194 of supplemental conveyor 180 may be of any type suitable for driving that conveyor under the conditions indicated. Trolleys 190 are suitably affixed to the opposite sides of frame 192 in any convenient manner and carry spaced rollers 390 that ride in the respective trackways 188, the latter being of any suitable character, but preferably being rectilinear and extending longitudinally of the frame 164, with a trackway 188 being provided on either side of same for cooperation with trolleys 190 provided on either side of the frame 192 of supplemental conveyor 180.

The chute structure 210 is illustrative of the general type employed for gravity conveying mail bags from a distribution point at the loading dock down to the loading dock for loading purposes, and as already indicated has a discharge mouth with a width comparable to the width of belt 194.

It will therefore be seen that this invention provides a mail bag loading apparatus which effects loading of the mail bags in the vehicle by propelling them into place for stacking purposes in a more or less random manner, with a dam arrangement being provided to preclude bag roll back that is automatically extendable with the height of the propelling conveyor that is deemed advisable depending on the part of the vehicle load that is being worked on. Vertical adjustment of the propelling conveyor discharge end provides trajectory control over the mail bags and operation of the propelling conveyor at the speed indicated effects a propelling of the mail bags into loaded position that compacts them without subjecting them to undue compressive forces.

The propelling conveyor is also adapted to receive bags to be loaded in a number of different ways, with hand truck loading into the vehicle being complicated for simplified installations, but for more mechanized installations, a full length conveyor apparatus being contemplated between the loading dock discharge chute and the propelling conveyor.

The foregoing dewcription and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. In bulk mail handling apparatus for loading elongated mail bags from a loading dock into the load receiving area of an end loading transport vehicle backed into load receiving position adjacent the dock to dispose its end opening to receive the bags, without requiring that pallets remain with the bags after they are loaded into the vehicle, said apparatus comprising:
   a wheeled frame,
   said frame carrying an upright support intermediate the ends thereof,
   a conveyor frame extending longitudinally of said wheeled frame and having one end of same connected to said support for swinging movement about a horizontal axis extending transversely of said frame, and the other end of same extending toward the load receiving position of the vehicle,
   extendible and contractable power means for supporting said conveyor frame other end on said wheeled frame and for raising and lowering same to swing said conveyor frame about said axis,
   roll up type baffle means connected between said conveyor frame other end and said wheeled frame and including means for automatically extending and retracting said baffle means as said conveyor frame is raised and lowered by said power means,
   said conveyor frame including a conveyor belt extending longitudinally thereof and presenting an upwardly facing load transporting surface,
   means for driving said conveyor surface forwardly of said wheeled frame for flinging mail bags carried by same into the vehicle at an elevation set by said extendible and contractable means,
   and means for supplying mail bags to said surface,
   said surface defining a path of movement for the mail bags that extends longitudinally of said conveyor frame and having a dimension transversely thereof that approximates the transverse dimension of the vehicle load receiving area.

2. In bulk mail handling apparatus for loading elongated mail bags from a loading dock into the load receiving area of an end loading transport vehicle backed into load receiving position adjacent the dock to dispose its end opening to receive the bags, said apparatus comprising:
   a conveyor assembly adapted to be mounted on the loading dock adjacent the load receiving position of the vehicle and providing conveyor means extending longitudinally thereof that has a width transversely thereof substantially spanning the transverse dimension of the vehicle area when said assembly is received therein,
   said conveyor assembly extending longitudinally of said apparatus for alignment with the vehicle and its end opening in the load receiving position of the vehicle and mounted for movement into and out of the vehicle,
   said conveyor means presenting an upwardly facing load transporting surface defining a path of movement for the mail bags that extends longitudinally of said conveyor assembly,
   with said conveyor assembly including a mail bag positioning conveyor section having its forward end extending toward the load receiving position of the vehicle and being mounted for vertical swinging movement,
   means for selectively raising and lowering said conveyor section forward end,
   a baffle member vertically movable with said section forward end behind which mail bags discharging from said section forward end are discharged,
   means for propelling mail bags from said section end forwardly of said baffle member,
   said conveyor assembly further comprising a wheeled frame on which said conveyor section is supported,
   said baffle member having a dimension transversely of the vehicle comparable to that of said conveyor means,
   said baffle member comprising a flexible sheet having one end of same secured to said forward end of said conveyor section,
   and means for extensibly and retractably securing the other end of said sheet to the forward end of said wheeled frame including means for maintaining said sheet tensioned between said conveyor section and said frame as said conveyor section forward end is raised and lowered relative to said wheeled frame,
   said means for extensibly and retractably securing said other end of said sheet comprising:
   a wind up roller journaled on said wheeled frame,
   said other end of said sheet being secured to said roller,
   and means for biasing said roller to wind up said sheet thereon.

3. The apparatus set forth in claim 2 wherein:
   said conveyor means includes a second conveyor section forming the rearward end of said load transporting surface at an elevation for convenient manual lifting of the bags onto the conveyor surface,
   said second section being supported on said wheeled frame and having the rearward end of said second section overhanging the rearward end of said wheeled frame,
   said conveyor first and second sections each having a conveyor belt operably trained thereon to form said surface,
   and means for driving the respective conveyor belts in a forward direction and comprising said propelling means.

4. The apparatus set forth in claim 3 wherein:

said driving means for said first section conveyor belt drives same at a speed on the order of 550 feet per minute, and said driving means for said second section conveyor drives same at a speed on the order of 200 feet per minutes.

5. The apparatus set forth in claim 3 wherein:

said first conveyor section rearward end is supported on said wheeled frame at an elevation adjacent the mid height of the vehicle load receiving area, said second conveyor section being upwardly inclined in a forward direction to dispose its forward end adjacent the rearward end of said first conveyor section.

6. The apparatus set forth in claim 5 including:

a hand truck for dumping a stack of mail bags on said belt of said second conveyor section, said hand truck comprising:

a wheeled frame, and a sideless hand truck body mounted on said wheeled frame for tilting movement about an axis extending normally of the sideless edge of said truck body, and means for releasably holding said truck body in upright position.

7. The apparatus set forth in claim 2 wherein:

said conveyor means includes a second conveyor section forming the rearward end of said load transporting surface at an elevation for convenient manual lifting of the bags onto the conveyor surface, said second section having its forward end supported on said wheeled frame and its rearward end wheeled for self support, said first conveyor section extending substantially the full length of said wheeled frame, said conveyor sections being aligned in smooth load transferring end to end arrangement.

8. The apparatus set forth in claim 7 wherein:

said second conveyor section is proportioned lengthwise thereof to extend between said first section and the loading dock when said wheeled frame is positioned to propell mail bags from said first conveyor section against the forward well of the vehicle load receiving area.

9. The apparatus set forth in claim 8 wherein:

said second conveyor section comprises a plurality of telescoping conveyor units.

10. The apparatus set forth in claim 3 including:

a mail bag feeding conveyor at the rearward end of said load transporting surface, said feeding conveyor being proportioned transversely thereof to accommodate bags loaded thereon in single file form and oriented to extend longitudinally of said feeding conveyor, said feeding conveyor forward end being carried by the rearward end of said wheeled frame, means for selectively positioning said feeding conveyor forward end at selected positions transversely of said second conveyor section for selectively supplying mail bags to the respective portions of said second conveyor section represented by said positions, with the rearward end of said feeder conveyor being wheeled for self support at an elevation for convenient manual lifting of the bags onto said feeder conveyor rearward end.

11. The apparatus set forth in claim 10 wherein:

the portion of said load transporting surface that is defined by said second conveyor section is marked to identify said positions of said feeding conveyor.

* * * * *